United States Patent [19]

Caudill et al.

[11] Patent Number: 4,518,826
[45] Date of Patent: May 21, 1985

[54] VANDAL-PROOF COMMUNICATION SYSTEM

[75] Inventors: Eddie T. Caudill; Richard T. Caudill; Lyle N. Conley, all of Albuquerque, N. Mex.

[73] Assignee: Mountain Systems, Inc., Albuquerque, N. Mex.

[21] Appl. No.: 452,094

[22] Filed: Dec. 22, 1982

[51] Int. Cl.³ .............................................. H04M 1/04
[52] U.S. Cl. .................................. 179/37; 179/100 L; 179/184; 381/88
[58] Field of Search .................... 179/37, 81 C, 84 L, 179/100 L, 146 E, 146 L, 178, 179, 183, 184, 2 D; 381/78, 87, 88, 90, 91; 181/150, 152; 200/DIG. 1; D14/53, 92

[56] References Cited

U.S. PATENT DOCUMENTS

| 2,578,367 | 12/1951 | Mott | 181/152 |
| 3,281,541 | 10/1966 | Learner | 200/DIG. 1 |
| 3,707,607 | 12/1972 | Reddick | 179/100 L |
| 3,978,479 | 8/1976 | Schmitz | 179/37 X |
| 4,045,629 | 8/1977 | Anzani | 200/DIG. 1 |

FOREIGN PATENT DOCUMENTS 1132378 10/1968 United Kingdom ................ 179/183

Primary Examiner—Keith E. George
Attorney, Agent, or Firm—Harvey B. Jacobson

[57] ABSTRACT

A touch switch and monitor lamp associated with an intercom station are embedded in a protective wall mounted plate with exposed ends flush with the planar surface of the plate which has openings through which sound is transmitted to or from a folded horn of a transducer having its driver unit spaced rearwardly of the plate and laterally of the openings.

7 Claims, 8 Drawing Figures

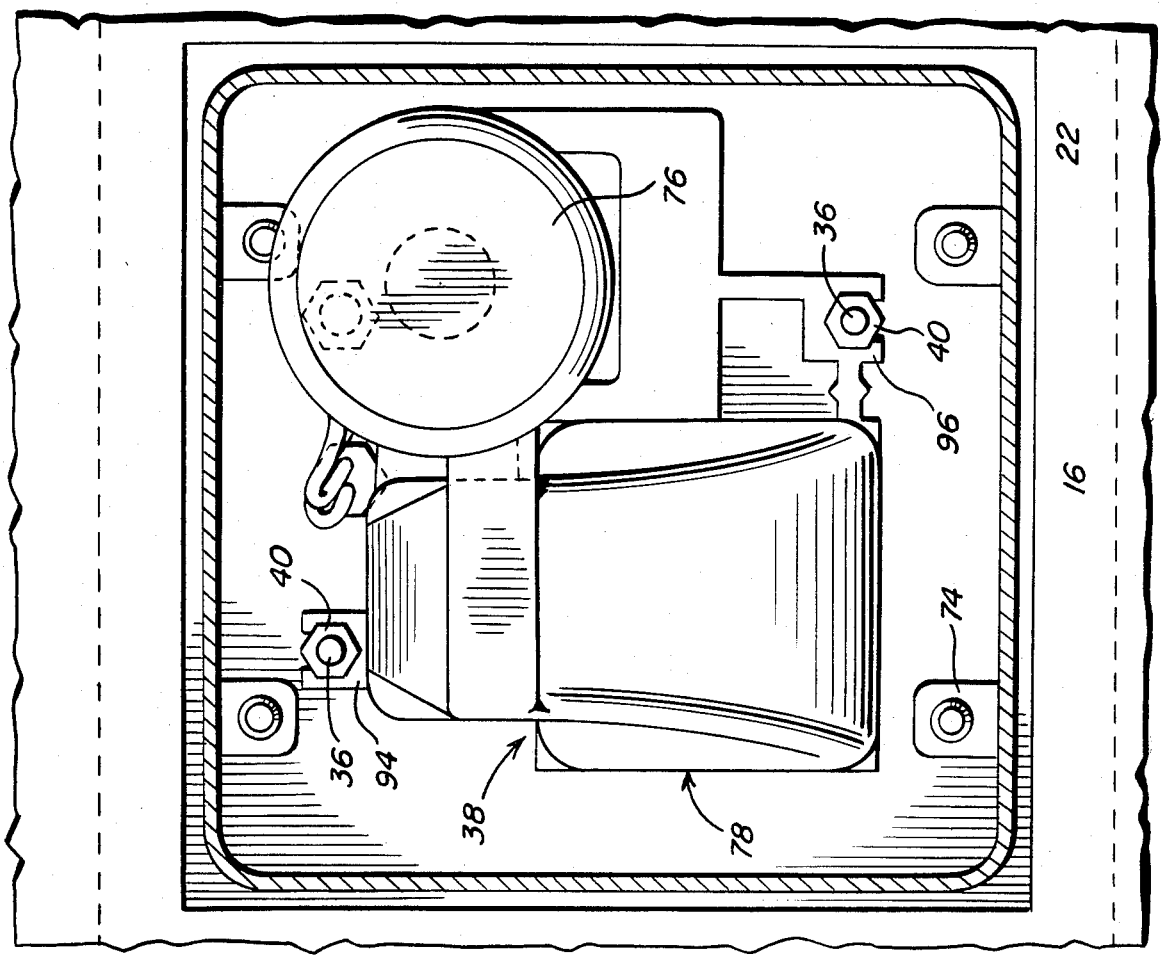
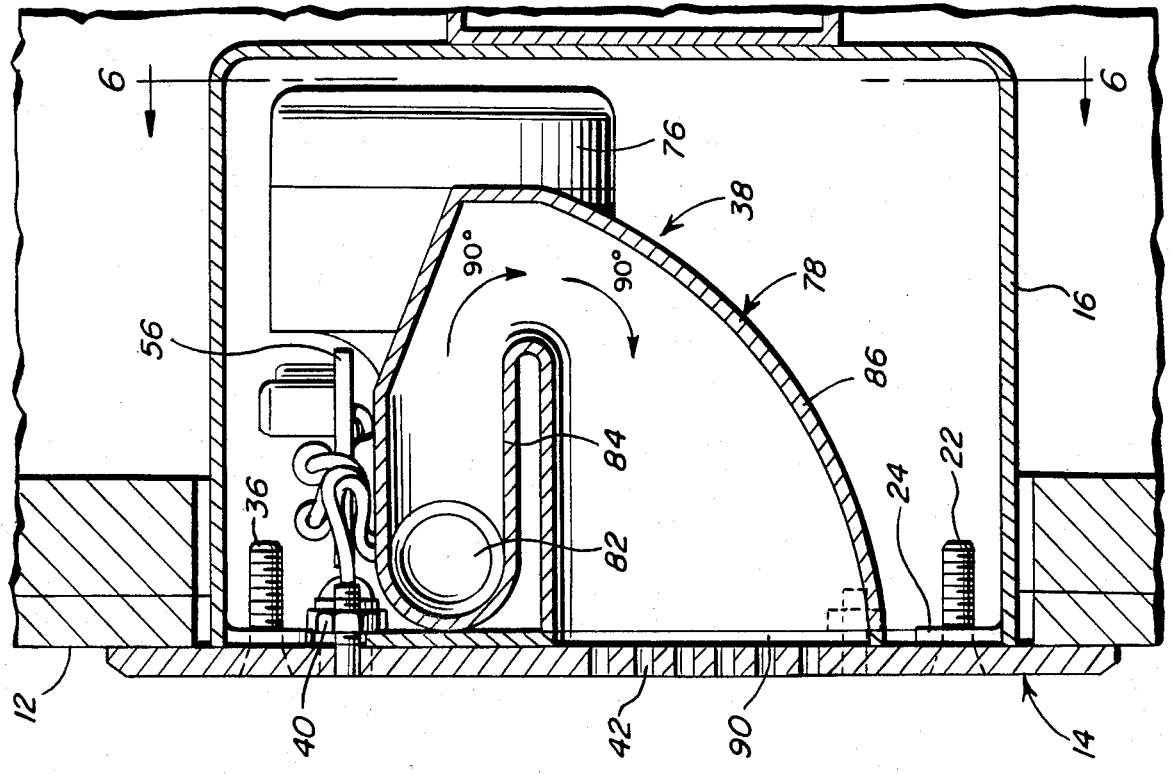

VANDAL-PROOF COMMUNICATION SYSTEM

BACKGROUND OF THE INVENTION

This invention relates to the construction of intercom stations and more particularly to a constructional arrangement that is vandal-resistant.

Intercom stations are at present provided in many institutions such as prisons or detention centers to establish communication between a master station and a plurality of remote call-in locations. The equipment at each of the remote intercom stations is often subject of physical abuse and vandalization. For example, projecting switch and lamp parts are sometimes removed and expensive microphone driver units damaged by robes inserted into openings in the plates on which such components are mounted.

It is therefore and important object of the present invention to provide intercom station hardware which will deter vandalism and tampering.

SUMMARY OF THE INVENTION

In accordance with the present invention, a touch type switch and LED type monitor lamp are utilized at each intercom station and are completely embedded in a protective plate which also mounts the transducer or microphone enclosed within a box rearwardly secured to the plate within a supporting wall structure. The exposed ends of the switch and lamp are flush with the planar surface of the plate. The only openings in the plate are those through which sound is transmitted to or from the transducer. Such sound transmitting openings are aligned with the open end of an exponential horn folded at four 90° turns to provide the desired sound column length as well as to space the drive unit of the transducer rearwardly of the plate and laterally of the openings therein. All fasteners utilized are arranged to be tamper resistant and projections from the planar surface of the protective plate are avoided.

BRIEF DESCRIPTION OF DRAWING FIGURES

These together with other objects and advantages which will become subsequently apparent reside in the details of construction and operation as more fully hereinafter described and claimed, reference being had to the accompanying drawings forming a part hereof, wherein like numerals refer to like parts throughout.

FIG. 5 is a transverse section view taken substantially through a plane indicated by section line 5—5 in FIG. 3.

FIG. 6 is a section view taken substantially through a plane indicated by section line 6—6 in FIG. 5.

DETAILED DESCRIPTION OF PREFERRED EMBODIMENT

Figure 1:
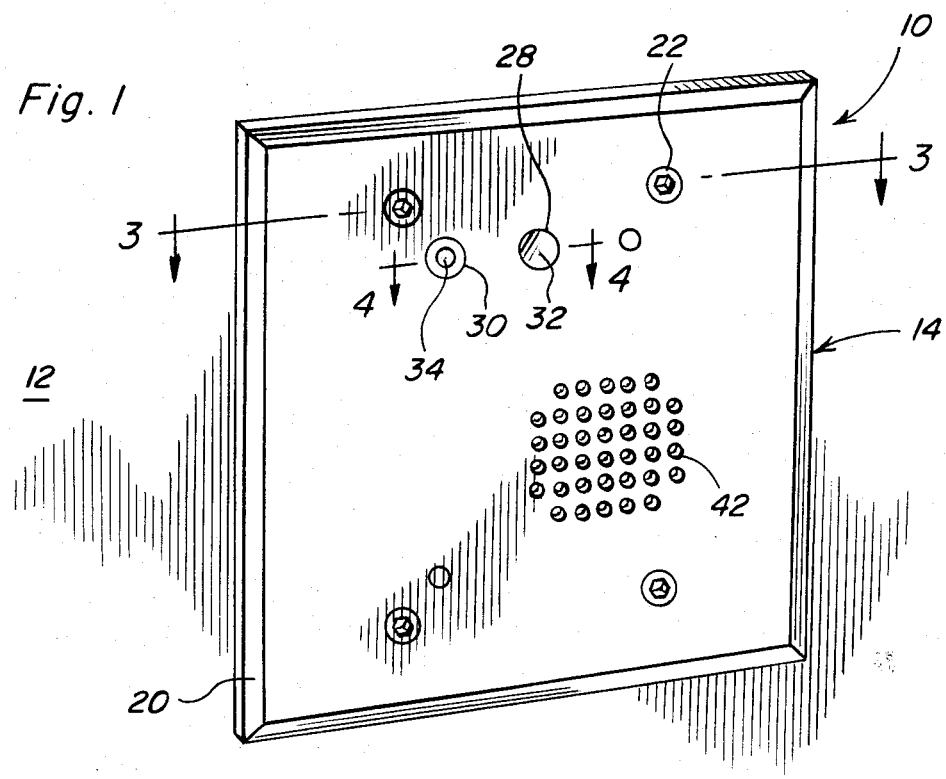
FIG. 1 is a perspective view showing an intercom station in accordance with the present invention.
Figure 3:
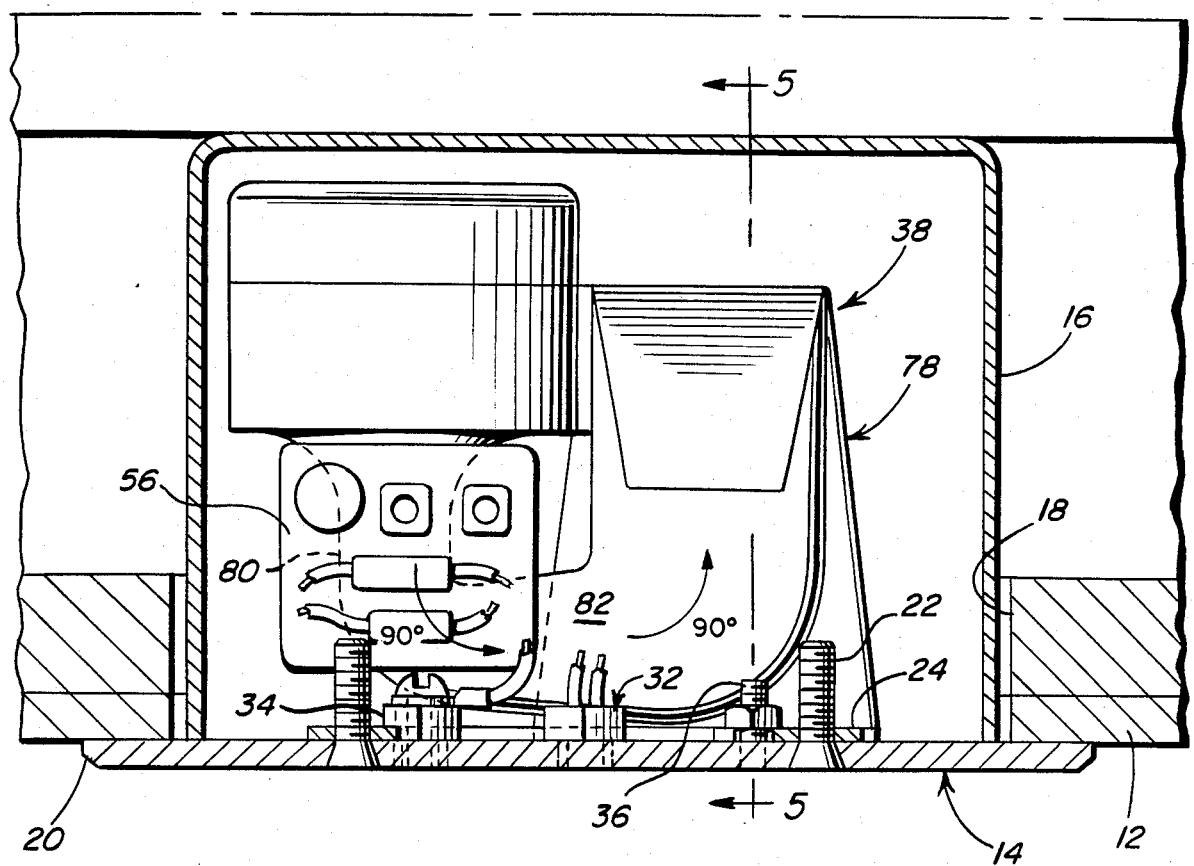
FIG. 3 is a section view taken substantially through a plane indicated by section line 3—3 in FIG. 1.
Figure 8:
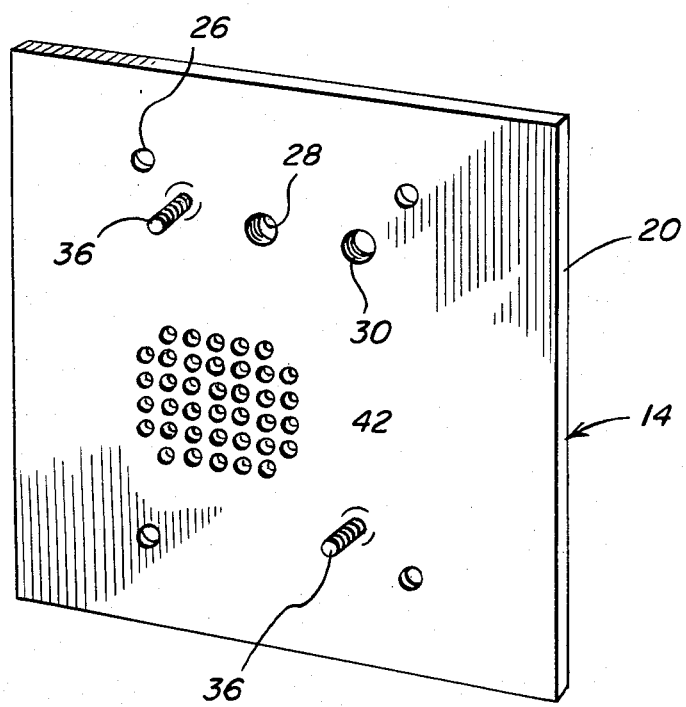
FIG. 8 is a rear perspective view of the front protective plate associated with the intercom station.

Referring now to the drawings in detail, FIG. 1 illustrates an intercom station 10 established on a vertical wall 12 of any suitable construction. The station location on the exposed side of the wall 12 is defined by a front plate 14 to which an enclosure or box 16 is secured extending rearwardly therefrom through an opening 18 in the wall as shown in FIG. 3. In the illustrated embodiment, the front plate is square, and provided with beveled edges 20. The plate may be made of a ¼ inch thick aluminum alloy, for example, having a planar surface with a brushed, anodized natural finish, and fastened to the box by four flat head machine screws 22 threadedly received through inturned tabs 24 projecting inwardly from the box at its open end as shown in FIGS. 3, 5 and 6. Four holes 26 are formed in the plate 14 as more clearly seen in FIG. 8 to receive the screws 22. Threaded openings 28 and 30 are also formed in the front plate to mount an LED type monitor lamp 32 and a touch switch 34 as shown in detail in FIG. 4. Also secured to the plate and projecting rearwardly therefrom into the box 16, are a pair of threaded studs 36 through which a transducer assembly 38 is mounted on the front plate and held assembled thereon within the box 16 by nuts 40 as shown in FIGS. 3, 5 and 6. The audible input to and output from the transducer assembly is transmitted through a cluster of closely spaced openings 42 formed in the front plate as shown in FIGS. 1, 5 and 8.

Figure 2:
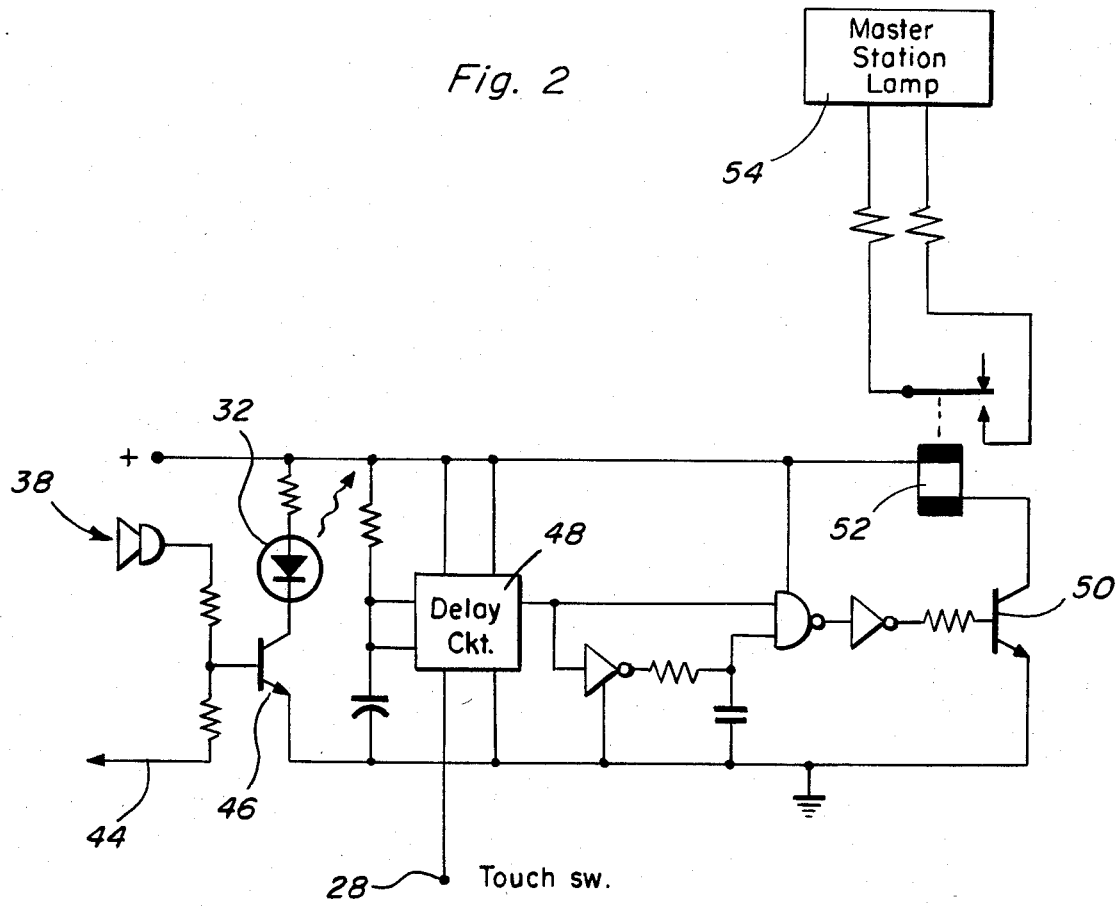
FIG. 2 is an electrical circuit diagram of the electronics associated with the intercom station.

The electronics associated with the intercom station is diagrammed in FIG. 2. As shown, signal inputs to the transducer assembly 38 from a speaker line 44 and to the speaker line from the transducer acting as a microphone is applied to the base of a drive transistor 46 to illuminate the monitor lamp 32. The touch switch 28 controls the operational mode and through a delay circuit 48 controls the duration of an output applied through logic components to the base of a driver transistor 50 to operate relay 52 through which a station identifying lamp 54 at a master station is energized. Thus, the usual call-in functions may be performed at a plurality of such intercom stations 10.

Figure 4:
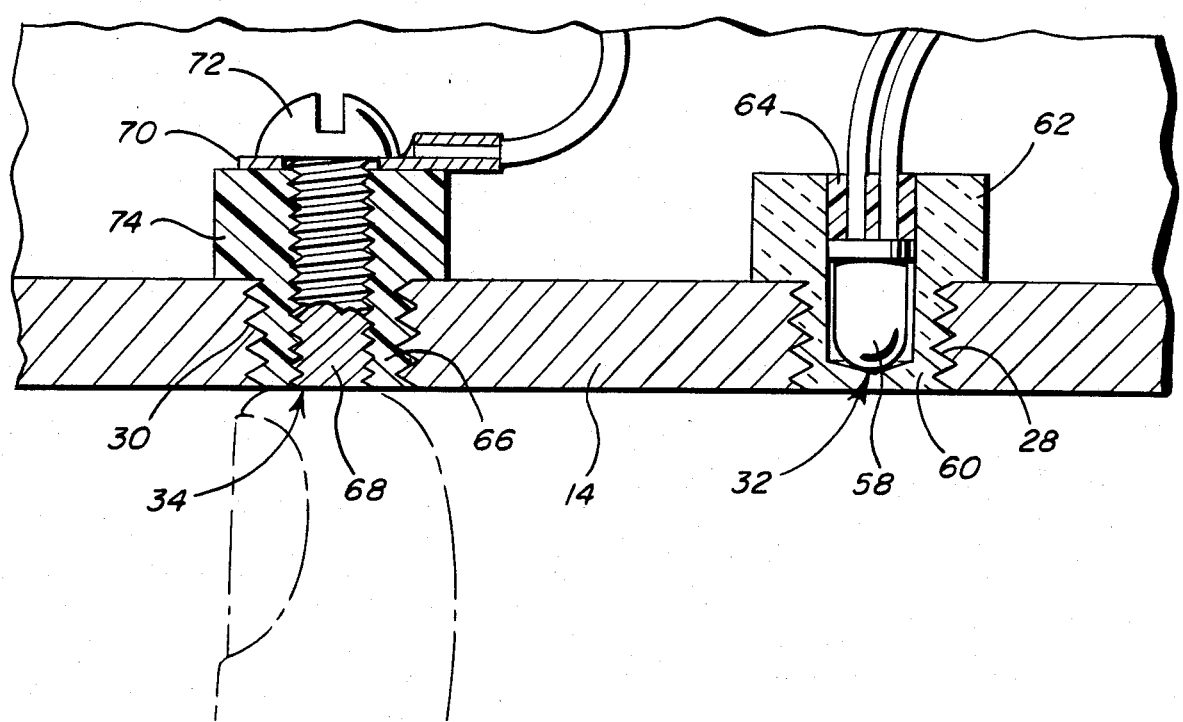
FIG. 4 is an enlarged partial section view taken substantially through a plane indicated by section line 4—4 in FIG. 1.
Figure 7:
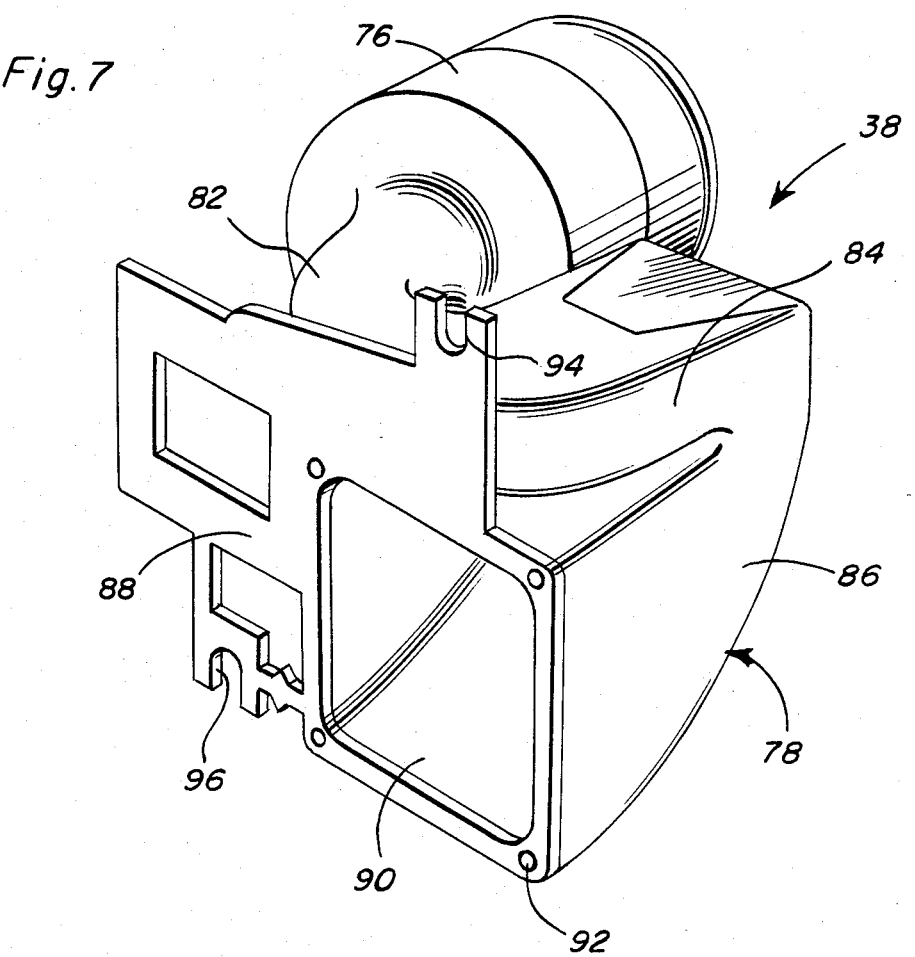
FIG. 7 is a perspective view of the disassembled transducer associated with the intercom station.

The electronics diagrammed in FIG. 2, are mounted on a circuit board 56 as shown in FIGS. 3 and 5, and wired to the monitor lamp 32 and touch switch 34 shown in detail in FIG. 4. The lamp 32 includes a light emitting diode 58 enclosed within a threaded, tubular member or bolt 60 having a hex head portion 62 abutting the rear side of the plate 14. The bolt 60 is made of a light transmissive or transparent and non-conductive material such as nylon, and the diode 58 is cemented in place by an epoxy cement 64. The front end of bolt 60 exposed through plate 14 is machined flush with the plate surface.

The touch switch 34 is formed by a non-conductive, tubular machine bolt 66 also made of Nylon, for example, threaded into opening 30. A stainless steel machine screw 68 electrically connects the switch to the electronics through a terminal lug 70 clamped between the slotted head 72 of screw 68 and the hex head portion 74 of the Nylon bolt 66 abutting the rear side of the front plate 14. The ends of the bolt 66 and screw 68 are machined flush with the exposed surface of the front plate as shown in FIG. 4.

The transducer assembly 38 shown in FIGS. 3, 5, 6 and 7 includes a cylindrical driver unit 76 connected to an exponential, folded horn generally referred to be reference numeral 78. The horn configuration includes four 90° turns to provide the requisite column length and vandal protection for the driver unit 76. One input end portion 80 of the horn of smaller cross-sectional passage area extends axially from the driver unit toward the front plate 14 as shown in FIG. 3. End portion 80 of the horn is connected by a first 90° turn to a second diverging passage portion 82 extending closely along the rear side of the plate 14. A second 90° turn connects portion 80 of the horn to a rearwardly extending portion 84 of constant cross-sectional area as more clearly seen in FIG. 5. A 180° or two 90° turns connect portion 84 to a forwardly extending and diverging horn portion 86 having an open output end 90 to which a mounting liner 88 is secured by fasteners at 92 as more clearly seen in FIG. 7. The liner 88 supports the circuit board 56 and has two slot formations 94 and 96 through which the studs 36 extend and to which the liner is clamped by the nuts 40 for mounting of the transducer assembly on the front plate as aforementioned. The open end 90 of the horn is aligned with the cluster of openings 42 in the front plate from which the driver unit 76 is spaced both rearwardly and laterally so that the input end portion 80 to which the driver unit is connected does not laterally overlap the cluster of openings, as shown.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In a mounting assembly for an intercom station having separate and spaced switch, lamp and transducer devices associated therewith, the mounting assembly including a common protective plate supporting all of said devices on a wall, said plate having an exposed surface through which sound transmitting openings extend in operative alignment with the transducer device, the improvement residing in means for rendering the station vandal-resistant, comprising means for embedding the switch and lamp devices in the protective plate, said transducer device having a driver unit and an exponential horn, said horn having a small input end connected to the driver unit and a large output end, and means mounting the horn rearwardly on the plate with the output end thereof in alignment with the sound transmitting openings for spacing the input end of the horn in lateral, non-overlapping relation to said openings.

2. In a mounting assembly for an intercom station having separate and spaced switch, lamp and transducer devices associated therewith, the mounting assembly including a common protective plate supporting all of said devices on a wall, said plate having an exposed surface through which sound transmitting openings extend in operative alignment with the transducer device, the improvement residing in means for rendering the station vandal-resistant, comprising means for embedding the switch and lamp devices in the protective plate flush with the exposed surface thereof, said transducer device having a driver unit and a horn interconnected therewith, and means mounting the horn rearwardly on the plate in alignment with the sound transmitting openings for spacing the driver unit laterally of said openings, the horn comprising exponential column means having a small passage end connected to the driver unit and a large open end in alignment with said sound transmitting openings.

3. The improvement as defined in claim 2 wherein the embedding means for each of the switch and lamp devices includes a non-conductive, tubular member having an exposed end flush with the exposed surface of the plate and an opposite head end abutting the plate in spaced relation to the exposed surface, the tubular member of the embedding means for the lamp device being light transmissive.

4. The improvement as defined in claim 3 wherein the mounting means includes a liner connected to the horn at said open end thereof and fastener means projecting rearwardly from the plate for adjustably securing the liner thereto.

5. The improvement as defined in claim 2 wherein the mounting means includes a liner connected to the horn at said open end thereof and fastener means projecting rearwardly from the plate for adjustably securing the liner thereto.

6. In a vandal-resistant mounting assembly for an intercom station having separate and spaced switch, lamp and transducer devices associated therewith, the mounting assembly including a common protective plate supporting all of said devices on a wall, said plate having an exposed surface through which sound transmitting openings extend in operative alignment with the transducer device, the improvement residing in said transducer device comprising a driver unit and an exponential horn connected to the driver unit, said horn being folded at four 90° turns and means mounting the horn rearwardly on the plate in alignment with the sound transmitting openings for spacing the driver unit laterally of said openings.

7. The improvement as defined in claim 6 wherein the mounting means includes a liner connected to the horn and fastener means projecting rearwardly from the plate for adjustably securing the liner thereto.

* * * * *